United States Patent
Oie et al.

(10) Patent No.: US 12,293,875 B2
(45) Date of Patent: May 6, 2025

(54) CERAMIC ELECTRONIC COMPONENT

(71) Applicant: Murata Manufacturing Co., Ltd., Kyoto-fu (JP)

(72) Inventors: Hirofumi Oie, Nagaokakyo (JP); Ai Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 128 days.

(21) Appl. No.: 18/342,046

(22) Filed: Jun. 27, 2023

(65) Prior Publication Data
US 2023/0343516 A1    Oct. 26, 2023

Related U.S. Application Data

(63) Continuation of application No. PCT/JP2021/046539, filed on Dec. 16, 2021.

(30) Foreign Application Priority Data

Jan. 29, 2021    (JP) ................... 2021-013528

(51) Int. Cl.
*H01G 4/012* (2006.01)
*H01G 2/12* (2006.01)
*H01G 4/008* (2006.01)
*H01G 4/12* (2006.01)

(52) U.S. Cl.
CPC ............. *H01G 4/012* (2013.01); *H01G 2/12* (2013.01); *H01G 4/008* (2013.01); *H01G 4/1209* (2013.01)

(58) Field of Classification Search
CPC ...... H01G 4/008; H01G 4/012; H01G 4/1209; H01G 2/06; H01G 2/212
See application file for complete search history.

(56) References Cited

U.S. PATENT DOCUMENTS

| | | |
|---|---|---|
| 2002/0088977 A1 | 7/2002 | Mori et al. |
| 2008/0229827 A1 | 9/2008 | Ozawa |
| 2010/0123994 A1 | 5/2010 | Nishisaka et al. |
| 2016/0233027 A1 | 8/2016 | Iijima et al. |
| 2017/0345563 A1 | 11/2017 | Usui |

(Continued)

FOREIGN PATENT DOCUMENTS

| | | | |
|---|---|---|---|
| JP | 2001-015371 A | 1/2001 |
| JP | 2002-260959 A | 9/2002 |

(Continued)

OTHER PUBLICATIONS

International Search Report for PCT/JP2021/046539 dated Mar. 15, 2022.

*Primary Examiner* — Nathan Milakovich
(74) *Attorney, Agent, or Firm* — MCDONALD HOPKINS LLC (57) ABSTRACT

A ceramic electronic component includes: a ceramic body having a first surface; an external electrode disposed at least on the first surface; an internal electrode disposed inside the ceramic body; and a connection conductor connected to the external electrode and extending through a surface or an interior of the ceramic body to electrically connect to the internal electrode. The external electrode includes an overhanging portion extending laterally from its portion connected to the connection conductor. At least a portion of the overhanging portion is a peeled portion peeled off from the ceramic body.

19 Claims, 10 Drawing Sheets

(56) References Cited

U.S. PATENT DOCUMENTS

| | | |
|---|---|---|
| 2019/0043662 A1 | 2/2019 | Yamamoto |
| 2020/0066449 A1 | 2/2020 | Tsutsumi et al. |
| 2020/0082986 A1 | 3/2020 | Yaso |

FOREIGN PATENT DOCUMENTS

| | | | |
|---|---|---|---|
| JP | 2004-128135 A | | 4/2004 |
| JP | 2006-041319 A | | 2/2006 |
| JP | 2006-100422 A | | 4/2006 |
| JP | 2006-245024 A | | 9/2006 |
| JP | 2007234654 A | * | 9/2007 |
| JP | 2010-114395 A | | 5/2010 |
| JP | 2010-141300 A | | 6/2010 |
| JP | 4486103 B2 | | 6/2010 |
| JP | 2017-216329 A | | 12/2017 |
| JP | 2018-113451 A | | 7/2018 |
| WO | 2017/002495 A1 | | 1/2017 |
| WO | 2017/179325 A1 | | 10/2017 |
| WO | 2018/216452 A1 | | 11/2018 |
| WO | 2018/220901 A1 | | 12/2018 |

* cited by examiner

CERAMIC ELECTRONIC COMPONENT

CROSS REFERENCE TO RELATED APPLICATION

This is a continuation of International Application No. PCT/JP2021/046539 filed on Dec. 16, 2021 which claims priority from Japanese Patent Application No. 2021-013528 filed on Jan. 29, 2021. The contents of these applications are incorporated herein by reference in their entireties.

BACKGROUND OF THE DISCLOSURE

Field of the Disclosure

The present disclosure relates to a ceramic electronic component.

Description of the Related Art

A radio-frequency component is described in WO 2017/179325 A1 (PTL 1). This radio-frequency component is formed by stacking a plurality of ceramic layers, and each ceramic layer is made of low temperature co-fired ceramic (LTCC) or high temperature co-fired ceramic (HTCC). The radio-frequency component described in PTL 1 includes a ceramic body, and an external electrode disposed on a lower surface of the ceramic body.

PTL 1: WO 2017/179325 A1

BRIEF SUMMARY OF THE DISCLOSURE

It may occur that a shock is applied to a ceramic electronic component mounted on a substrate through an external electrode. The shock may be applied due to a drop of the entire device, deflection of the substrate, environmental loads, and the like. The shock due to environmental loads is, for example, a thermal shock due to temperature cycles. When a shock is applied, cracks may be formed in a ceramic body around the external electrode. If the cracks reach an internal circuit inside the ceramic body, a disconnection may occur, or a migration may occur due to moisture intrusion into the cracks, resulting in malfunction.

In view of this, a possible benefit of the present disclosure is to provide a ceramic electronic component that can reduce the probability of cracks being formed around an external electrode when a shock is applied.

In order to achieve the above possible benefit, a ceramic electronic component based on the present disclosure includes: a ceramic body having a first surface; an external electrode disposed at least on the first surface; an internal electrode disposed inside the ceramic body; and a connection conductor connected to the external electrode and extending through a surface or an interior of the ceramic body to electrically connect to the internal electrode. The external electrode includes an overhanging portion extending laterally from its portion connected to the connection conductor. At least a portion of the overhanging portion is a peeled portion peeled off from the ceramic body.

According to the present disclosure, at least a portion of the overhanging portion of the external electrode is the peeled portion, and it is thus possible to reduce the probability of cracks being formed around the external electrode when a shock is applied.

DETAILED DESCRIPTION OF THE DISCLOSURE

Any dimensional ratio shown in the drawings does not necessarily represent the exact actual dimensional ratio, but may be exaggerated for convenience of illustration. In the following description, the concept "top/upper" or "bottom/lower" mentioned herein does not necessarily refer to the exact "top/upper" or "bottom/lower," but may refer, in a relative sense, to "top/upper" or "bottom/lower" of a posture shown in a drawing(s).

The concept of "ceramic electronic component" described below is intended to encompass not only an electronic component as an individual element such as a capacitor or an inductor, but also a combination of a plurality of elements with a substrate, namely, a so-called "module."

Embodiment 1

Figure 1:
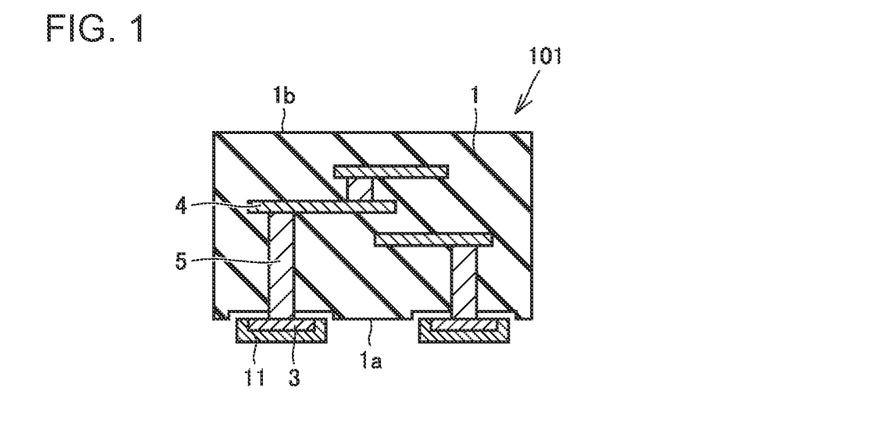
FIG. 1 is a cross-sectional view of a ceramic electronic component in Embodiment 1 based on the present disclosure.
Figure 2:
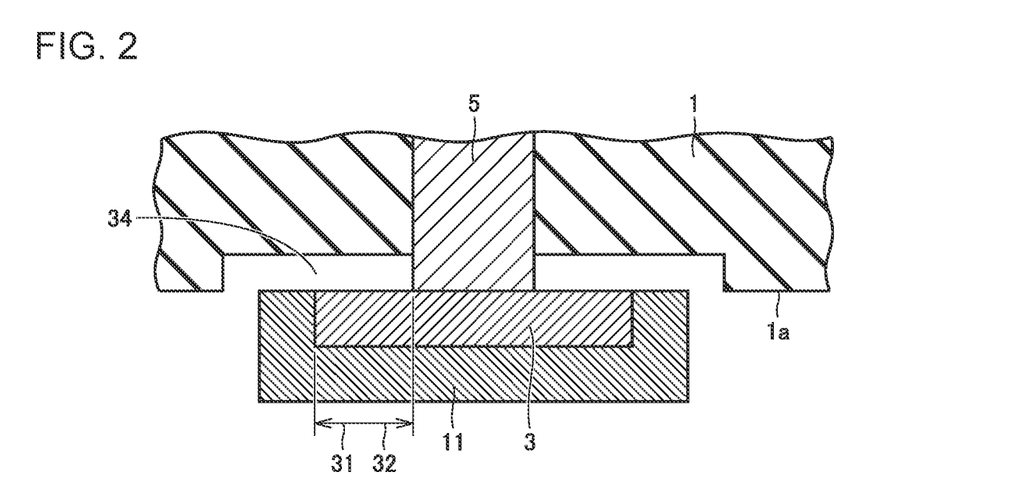
FIG. 2 is a partially enlarged view of an external electrode shown in FIG. 1 and its vicinity.

Referring to FIGS. 1 to 2, a ceramic electronic component in Embodiment 1 based on the present disclosure will be described. FIG. 1 shows a ceramic electronic component 101 in this embodiment. Ceramic electronic component 101 has a first surface 1a as a lower surface. Ceramic electronic component 101 has an external electrode 3 in the form of a pad on first surface 1a. FIG. 2 shows external electrode 3 in FIG. 1 and its vicinity in an enlarged manner.

Ceramic electronic component 101 includes: a ceramic body 1 having first surface 1a; external electrode 3 disposed at least on first surface 1a; an internal electrode 4 disposed inside ceramic body 1; and a connection conductor 5 connected to external electrode 3 and extending through a surface or an interior of ceramic body 1 to electrically connect to internal electrode 4. External electrode 3 includes an overhanging portion 31 extending laterally from its portion connected to connection conductor 5. At least a portion of overhanging portion 31 is a peeled portion 32 peeled off from ceramic body 1.

In this embodiment, at least a portion of overhanging portion 31 of external electrode 3 is peeled portion 32, and it is thus possible to lessen the degree of transmission of a shock to body 1 when the shock is applied. In ceramic electronic component 101, therefore, it is possible to reduce the probability of cracks being formed around external electrode 3 when a shock is applied.

Embodiment 2

Figure 3:
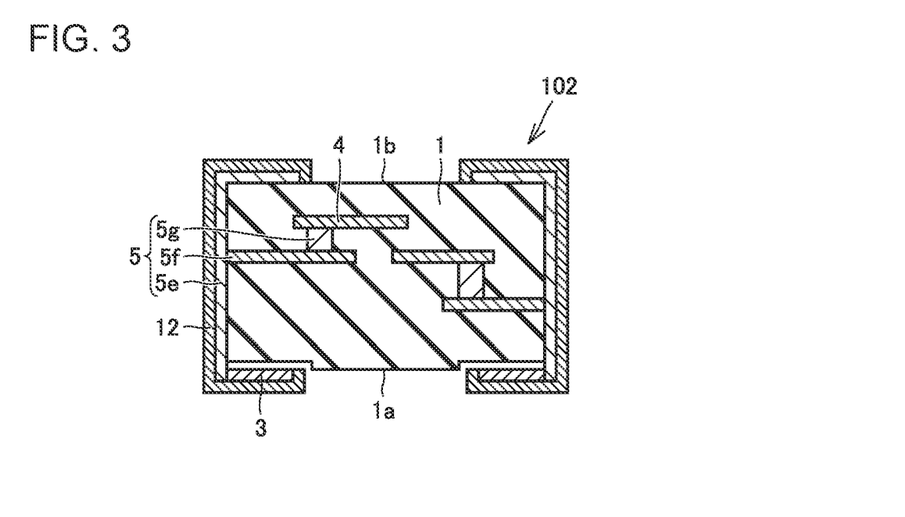
FIG. 3 is a cross-sectional view of a ceramic electronic component in Embodiment 2 based on the present disclosure.
Figure 4:
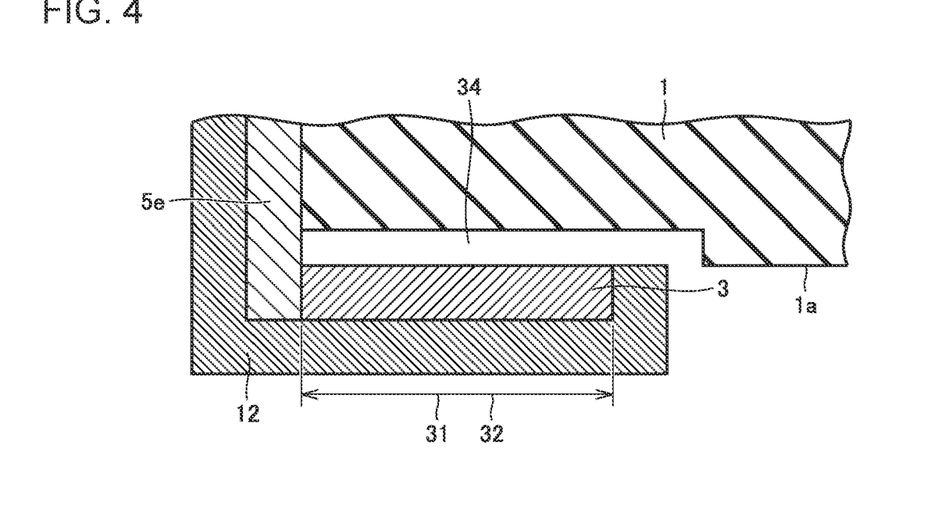
FIG. 4 is a partially enlarged view of an external electrode shown in FIG. 3 and its vicinity.

Referring to FIGS. 3 to 4, a ceramic electronic component in Embodiment 2 based on the present disclosure will be described. FIG. 3 shows a ceramic electronic component 102 in this embodiment. FIG. 4 shows a portion of FIG. 3 in an enlarged manner. Ceramic electronic component 102 has first surface 1a as a lower surface. Ceramic electronic component 102 has an external electrode across its upper surface, side surface and lower surface. Here, a portion of this external electrode that is located on the lower surface is referred to as external electrode 3.

Ceramic electronic component 102 includes: ceramic body 1 having the first surface; external electrode 3 disposed at least on first surface 1a; internal electrode 4 disposed inside ceramic body 1; and connection conductor 5 connected to external electrode 3 and extending through the surface or the interior of ceramic body 1 to electrically connect to internal electrode 4. Connection conductor 5 includes portions 5e, 5f and 5g. External electrode 3 includes overhanging portion 31 extending laterally from its portion connected to connection conductor 5. At least a portion of overhanging portion 31 is peeled portion 32 peeled off from ceramic body 1. While a combination of portion 5e which is part of connection conductor 5 and external electrode 3 disposed on first surface 1a may be referred to as "external electrode," a combination of portions 5e, 5f and 5g is regarded here as connection conductor 5. External electrode 3 and portion 5e may be made of different types of materials, or may be made of the same type of material in an integrated manner. Portion 5e and portion 5f may be made of the same type of material or different types of materials.

In this embodiment, at least a portion of overhanging portion 31 of external electrode 3 is peeled portion 32, and it is thus possible to lessen the degree of transmission of a shock to body 1 when the shock is applied. In ceramic electronic component 102, therefore, it is possible to reduce the probability of cracks being formed around external electrode 3 when a shock is applied.

Although the entire overhanging portion 31 is peeled portion 32 in Embodiments 1 and 2, this is only exemplary. Peeled portion 32 may be a portion or the whole of overhanging portion 31.

In Embodiments 1 and 2, there is shown a gap 34 at peeled portion 32 between external electrode 3 and ceramic body 1 (see FIGS. 2 and 4). In practice, there may or may not be such gap 34. In peeled portion 32, external electrode 3 may contact ceramic body 1 while maintaining the state of being peeled off from ceramic body 1. In this case, external electrode 3 is in close contact with ceramic body 1, and there is consequently no gap 34. Such a configuration may also be employed.

Embodiment 3

Referring to FIGS. 5 to 21, a method for manufacturing a ceramic electronic component in Embodiment 3 based on the present disclosure will be described. The manufacturing method described here is a manufacturing method for obtaining a ceramic electronic component similar to those described in Embodiments 1 and 2.

Figure 5:
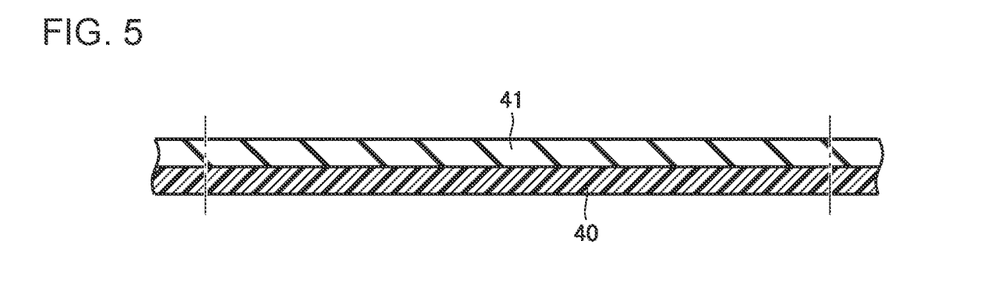
FIG. 5 is an illustrative view of a first step of a method for manufacturing a ceramic electronic component in Embodiment 3 based on the present disclosure.

First, a low temperature co-fired ceramics (LTCC) green sheet is molded. As shown in FIG. 5, a ceramic green sheet 41 is held on a surface of a carrier film 40. While this LTCC green sheet may have a size of one ceramic electronic component, a large-sized sheet corresponding to a plurality of ceramic electronic components is generally prepared. In FIG. 5 and subsequent drawings, cutting lines that will be used later for cutting into pieces with the size of an individual ceramic electronic component are indicated by chain-double-dotted lines.

Figure 6:
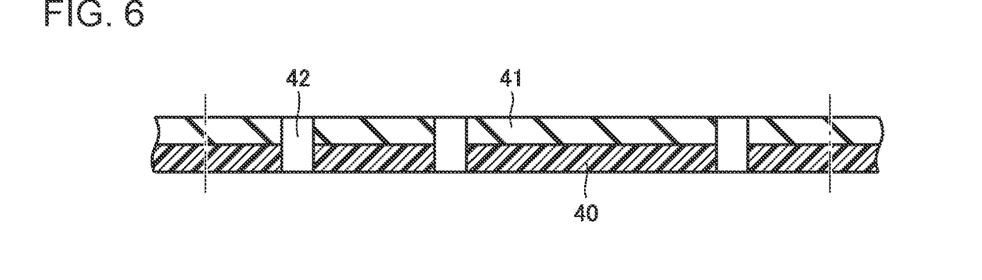
FIG. 6 is an illustrative view of a second step of the method for manufacturing the ceramic electronic component in Embodiment 3 based on the present disclosure.
Figure 7:
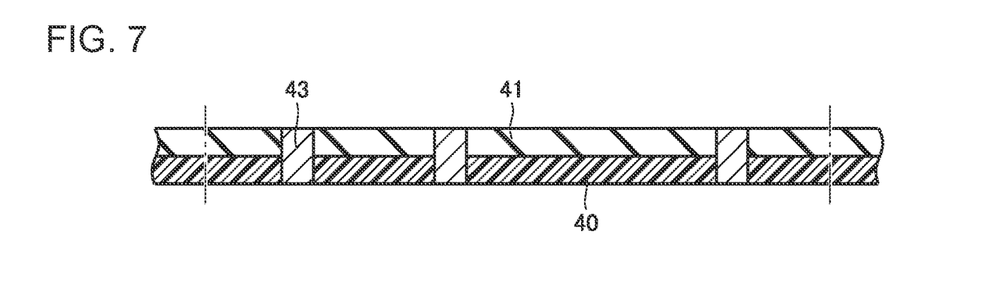
FIG. 7 is an illustrative view of a third step of the method for manufacturing the ceramic electronic component in Embodiment 3 based on the present disclosure.

As shown in FIG. 6, holes are drilled in the LTCC green sheet. A hole 42 is formed to pass through at least ceramic green sheet 41 by laser processing and the like. Hole 42 may pass through not only ceramic green sheet 41 but also carrier film 40. In the example shown in FIG. 6, hole 42 passes collectively through ceramic green sheet 41 and carrier film 40. As shown in FIG. 7, hole 42 is filled with a conductive paste 43, which is then dried.

Figure 8:
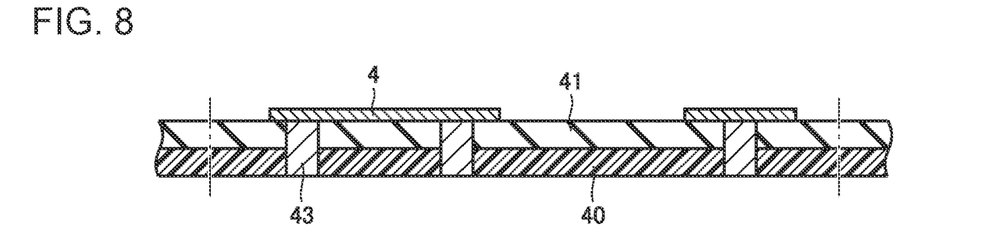
FIG. 8 is an illustrative view of a fourth step of the method for manufacturing the ceramic electronic component in Embodiment 3 based on the present disclosure.
Figure 9:
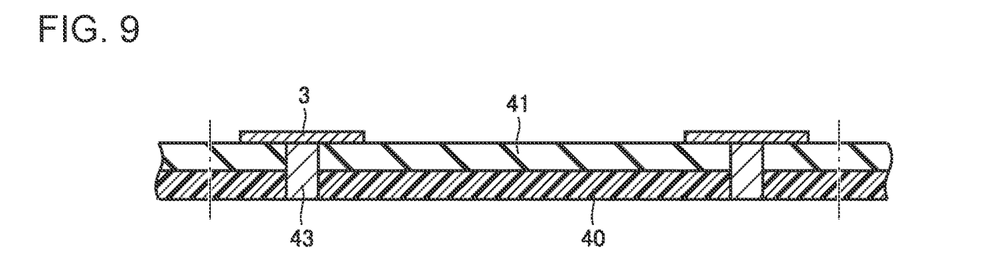
FIG. 9 is an illustrative view of a fifth step of the method for manufacturing the ceramic electronic component in Embodiment 3 based on the present disclosure.

By these steps, a plurality of carrier films 40 each having ceramic green sheet 41 placed thereon are produced. Internal electrode 4 is printed on the surface of ceramic green sheet 41 using a conductive paste as needed. Internal electrode 4 required for each layer is printed in consideration of the design. Some of ceramic green sheets 41 may not have any internal electrodes 4 printed thereon. Internal electrode 4 is printed as shown in FIG. 8, for example. In some of ceramic green sheets 41, external electrode 3 is printed as shown in FIG. 9. A conductive paste having poor sinterability with ceramic is used to print external electrode 3. The "conductive paste having poor sinterability with ceramic" may be, for example, a conductive paste containing no or only a small amount of inorganic component similar to that of the ceramic base material. The "inorganic component similar to that of the ceramic base material" is, for example, a glass component. Such a conductive paste has a reduced degree of adhesion with the ceramic body, and is thus easily peeled off from the ceramic body. For example, it could be a conductive paste having a content ratio of an inorganic component other than metal of 5% by weight or less. More preferably, the conductive paste used to print external electrode 3 does not contain any inorganic components other than metal.

Figure 10:
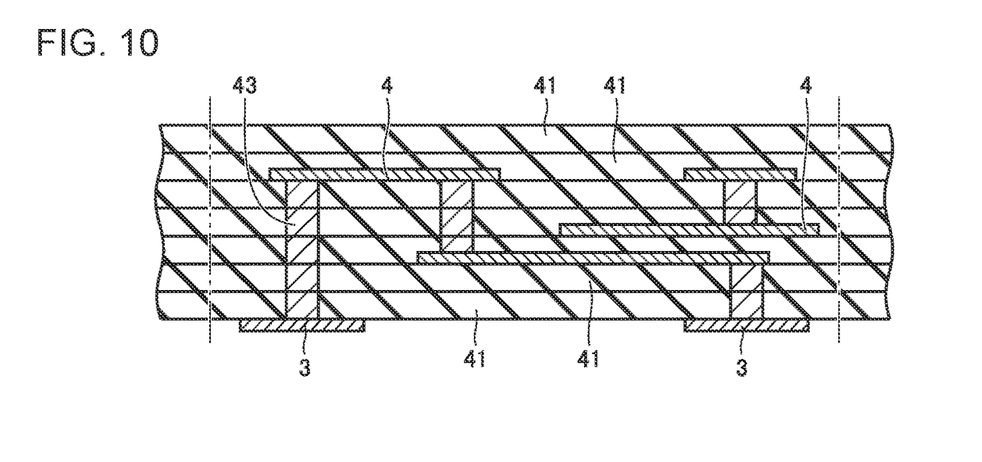
FIG. 10 is an illustrative view of a sixth step of the method for manufacturing the ceramic electronic component in Embodiment 3 based on the present disclosure.

Respective ceramic green sheets 41 are stripped from carrier films 40 and stacked together. A stack as shown in FIG. 10 is thus obtained. This stack may be compression-bonded. That is, pressure and heat may be applied to this stack.

Figure 11:
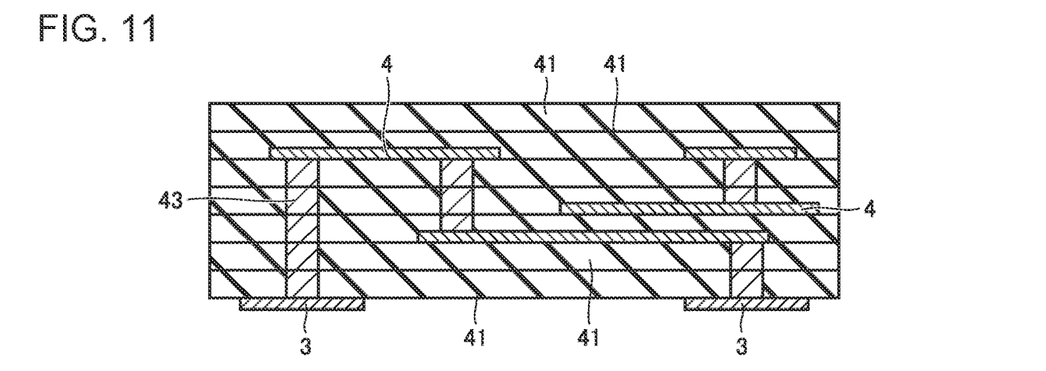
FIG. 11 is an illustrative view of a seventh step of the method for manufacturing the ceramic electronic component in Embodiment 3 based on the present disclosure.
Figure 12:
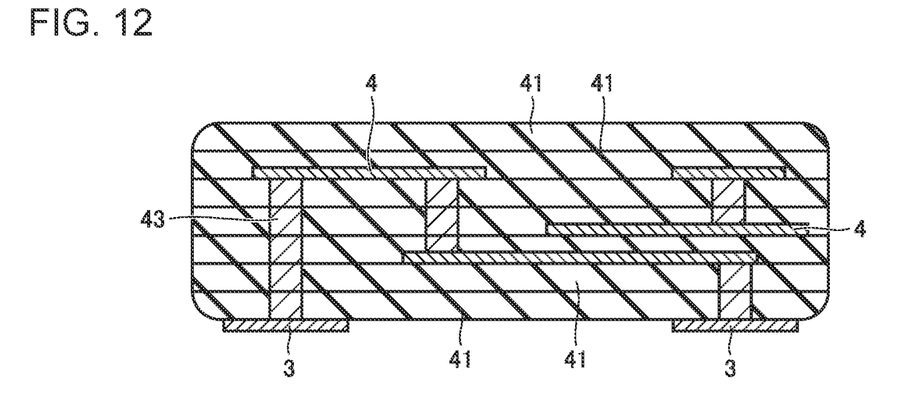
FIG. 12 is a cross-sectional view where barrel polishing has been performed after the seventh step of the method for manufacturing the ceramic electronic component in Embodiment 3 based on the present disclosure.

This stack is cut into pieces with the size of an individual ceramic electronic component. A stack as shown in FIG. 11 is thus obtained. This stack may be barrel-polished. When barrel polishing is performed, each chip-shaped stack is beveled as shown in FIG. 12. In the following description, however, it is assumed that barrel polishing is not performed.

Figure 13:
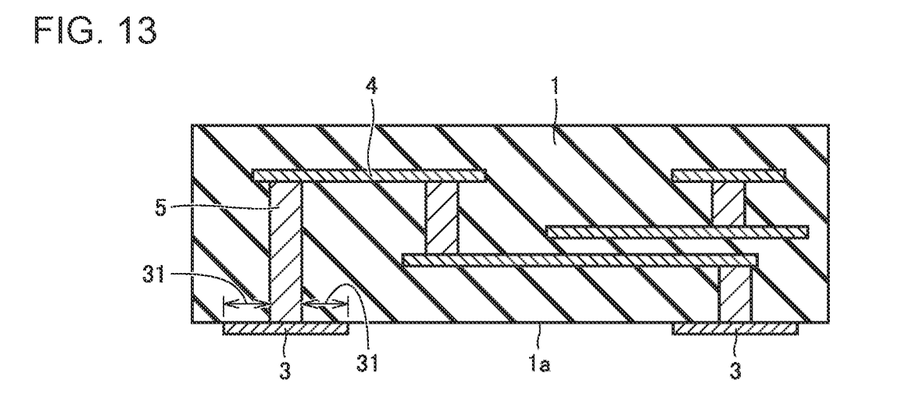
FIG. 13 is an illustrative view of an eighth step of the method for manufacturing the ceramic electronic component in Embodiment 3 based on the present disclosure.

The stack thus obtained is fired. The firing causes the plurality of stacked ceramic green sheets 41 to be integrated into single ceramic body 1 as shown in FIG. 13. External electrode 3 is connected to connection conductor 5, and includes overhanging portion 31 formed as a portion extending laterally from its portion connected to connection conductor 5. Since external electrode 3 has been printed using the conductive paste having poor sinterability, overhanging portion 31 of external electrode 3 barely adheres to first surface 1a of ceramic body 1.

Figure 14:
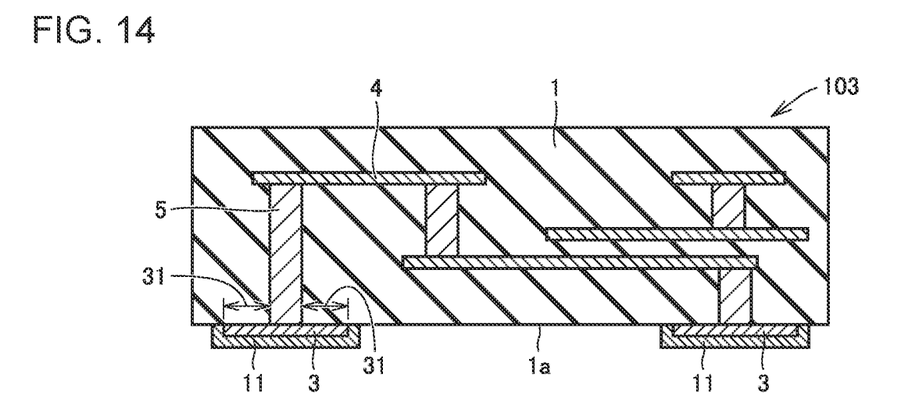
FIG. 14 is an illustrative view of a ninth step of the method for manufacturing the ceramic electronic component in Embodiment 3 based on the present disclosure.

External electrode 3 of this stack is plated. The surface of external electrode 3 is thus covered with a plating film 11 as shown in FIG. 14. The plating performed here may be, for example, Sn/Ni plating, namely, Ni plating on the surface of external electrode 3 and additional Sn plating thereon. Alternatively, it may be Au/Ni plating, namely, Ni plating on the surface of external electrode 3, and additional Au plating thereon. A ceramic electronic component 103 is obtained by performing these steps. Ceramic electronic component 101 described in Embodiment 1 can also be obtained by a similar manufacturing method.

Figure 15:
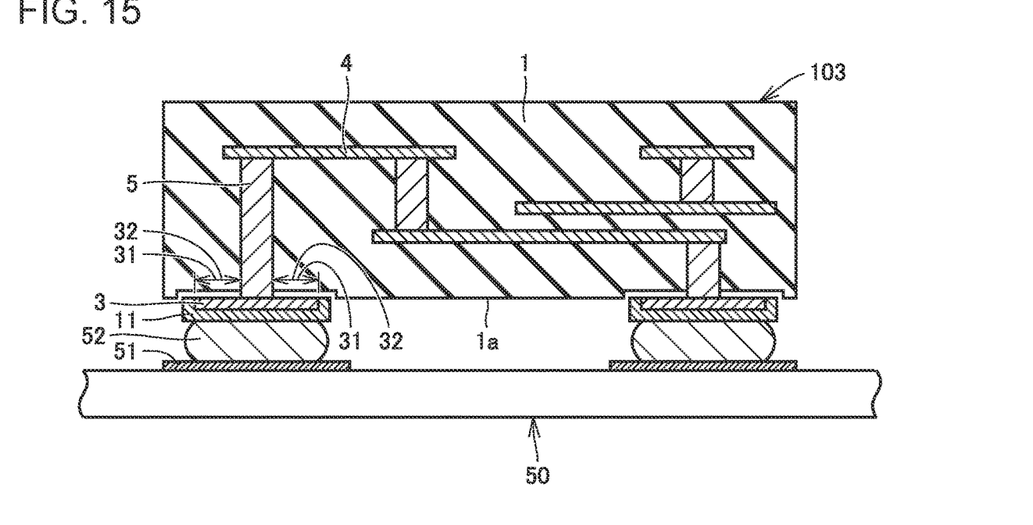
FIG. 15 is a cross-sectional view of the ceramic electronic component in Embodiment 3 based on the present disclosure mounted on a substrate.

Further, ceramic electronic component 103 is mounted on a substrate 50 as shown in FIG. 15. An electrode 51 is provided on a surface of substrate 50. External electrode 3 covered with plating film 11 is connected to electrode 51 of substrate 50 through a solder 52. Solder 52 may be disposed on electrode 51 in advance, or may be attached to the external electrode 3 side in advance. Stress acts on external electrode 3 due to a shock applied during such mounting. External electrode 3 is thereby peeled off from ceramic body 1. Peeled portion 32 is thus formed. It should be noted that at the portion where external electrode 3 is in contact with connection conductor 5, external electrode 3 is not easily peeled off, and thus, the connection between external electrode 3 and connection conductor 5 is maintained. Ceramic electronic component 103 is mounted on another member through external electrode 3 in this manner. In this state, there is peeled portion 32 in ceramic electronic component 103.

Figure 16:
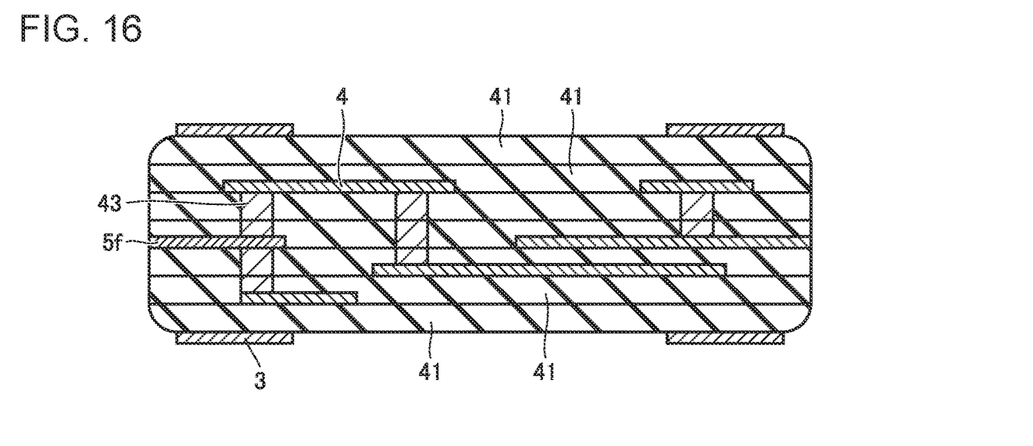
FIG. 16 is a cross-sectional view where barrel polishing has been performed in a modification of the method for manufacturing the ceramic electronic component in Embodiment 3 based on the present disclosure.
Figure 17:
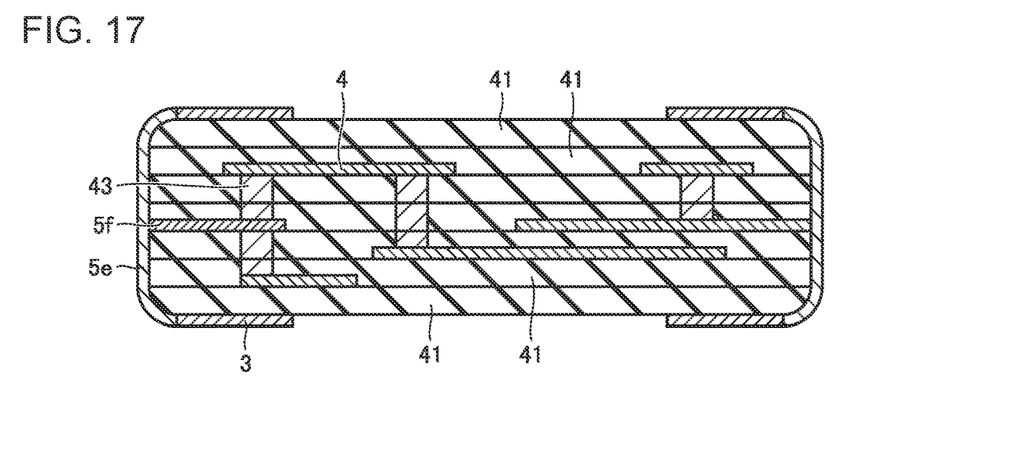
FIG. 17 is a cross-sectional view of a first example state after dipping into a conductive paste in the modification of the method for manufacturing the ceramic electronic component in Embodiment 3 based on the present disclosure.

Next, a modification is also described. In the modification, external electrode 3 is provided on the lower surface, and aside from this electrode, a similar electrode is printed on the upper surface as well. FIG. 16 shows this stack after being barrel-polished. Further, both ends of this stack are dipped into a conductive paste, and accordingly a structure as shown in FIG. 17 is obtained. Portion 5e is formed by the dipping. Portion 5e is connected to portion 5f that is disposed inside the stack in advance.

Figure 18:
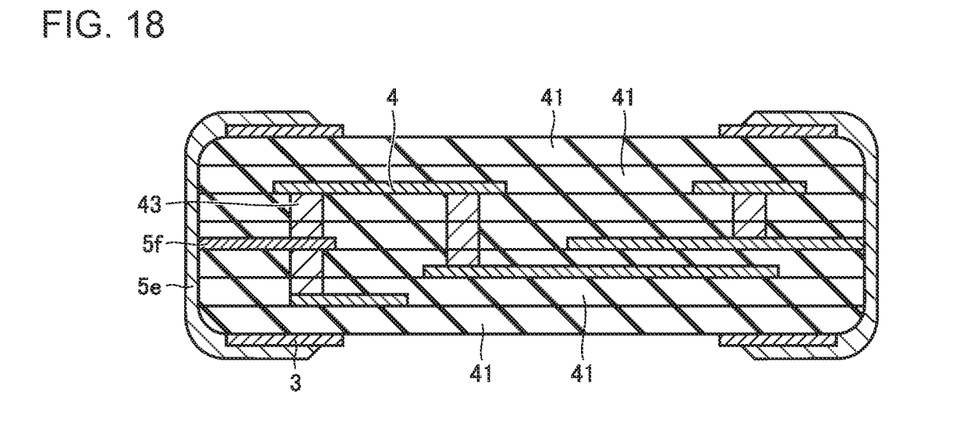
FIG. 18 is a cross-sectional view of a second example state after the dipping into the conductive paste in the modification of the method for manufacturing the ceramic electronic component in Embodiment 3 based on the present disclosure.
Figure 19:
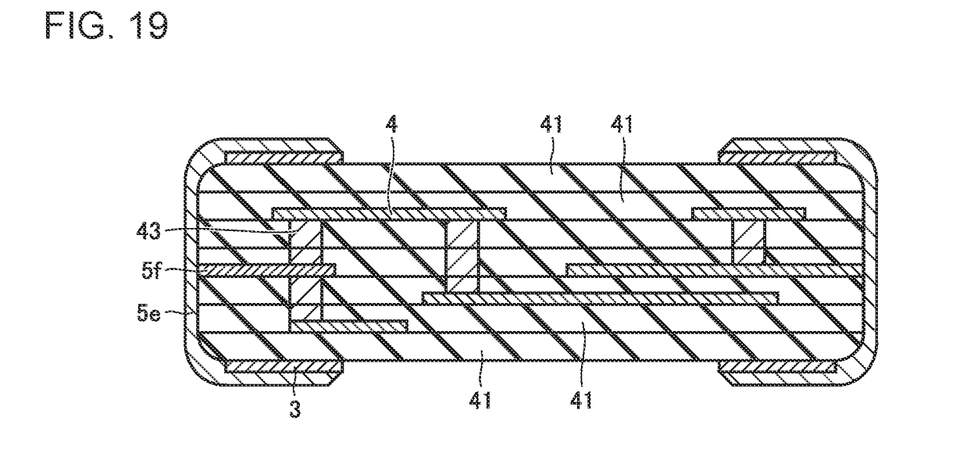
FIG. 19 is a cross-sectional view of a third example state after the dipping into the conductive paste in the modification of the method for manufacturing the ceramic electronic component in Embodiment 3 based on the present disclosure.

Although portion 5e is shown in FIG. 17 as being in contact with only the end face of external electrode 3, this is only exemplary. While such a configuration may be employed, in practice, when portion 5e is formed by the dipping, portion 5e may be formed to cover external electrode 3. For example, portion 5e may be formed to cover a portion of the surface of external electrode 3, as shown in FIG. 18. Alternatively, portion 5e may be formed to cover the entire surface of external electrode 3, as shown in FIG. 19. If portion 5e formed by the dipping covers external electrode 3, external electrode 3 may be less likely to be peeled off.

While external electrode 3 is shown in FIGS. 16 to 19 as being placed on a flat surface of the stack, this is for convenience of illustration. In practice, external electrode 3 is sometimes embedded in the surface of the stack during the compression bonding. Accordingly, external electrode 3 may be embedded in the surface of the stack. While a reference has been made to FIGS. 16 to 19 here, the same applies to other drawings.

Figure 20:
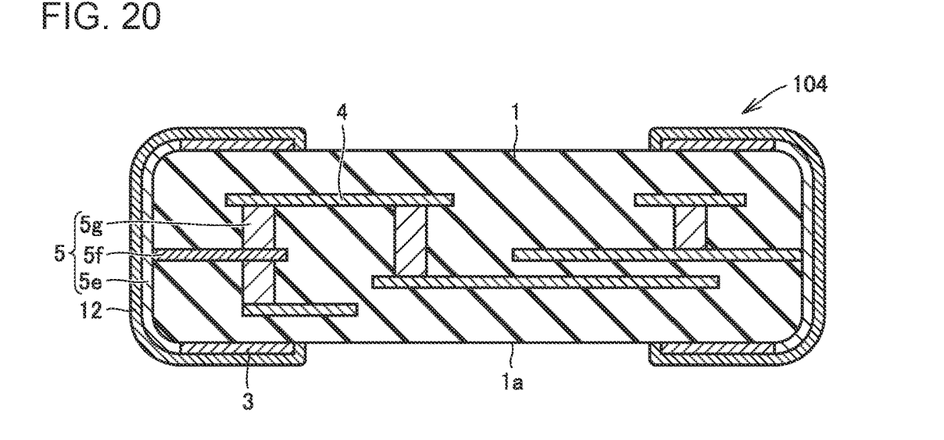
FIG. 20 is a cross-sectional view after plating is performed in the modification of the method for manufacturing the ceramic electronic component in Embodiment 3 based on the present disclosure.

Further, external electrode 3 of this stack is plated. The surfaces of external electrode 3 and portion 5e are thus covered with a plating film 12 as shown in FIG. 20. The details of plating film 12 are as described with regard to plating film 11. A ceramic electronic component 104 is obtained by performing these steps. Ceramic electronic component 102 described in Embodiment 2 can also be obtained by a similar manufacturing method.

Figure 21:
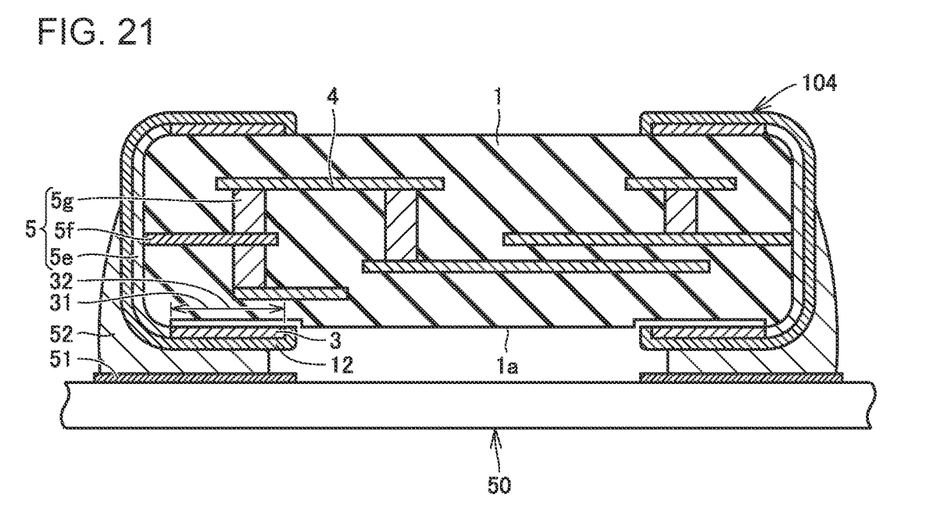
FIG. 21 is a cross-sectional view of a ceramic electronic component obtained in the modification of the method for manufacturing the ceramic electronic component in Embodiment 3 based on the present disclosure mounted on a substrate.

Further, ceramic electronic component 104 is mounted on substrate 50 as shown in FIG. 21. Electrode 51 is provided on the surface of substrate 50. External electrode 3 covered with plating film 12 is connected to electrode 51 of substrate 50 through solder 52. Solder 52 may be disposed on electrode 51 in advance, or may be attached to ceramic electronic component 104 in advance. Stress acts on external electrode 3 due to a shock applied during such mounting. External electrode 3 is thereby peeled off from ceramic body 1. Peeled portion 32 is thus formed. It should be noted that at the portion where external electrode 3 is in contact with portion 5e of connection conductor 5, external electrode 3 is not easily peeled off, and thus, the connection between external electrode 3 and portion 5e is maintained.

In this embodiment, ceramic electronic components having respective intended peeled portions 32 can be easily obtained.

Even when a conductive paste containing an inorganic component similar to that of the ceramic base material is used, glass can be segregated at an interface between the ceramic and the electrode by increasing the time during which the stack is maintained at the maximum temperature during firing. The adhesion at the interface between the electrode and the ceramic can be reduced by this segregation of glass at the interface as well. Peeled portion 32 can be intentionally formed by making use of this phenomenon as well.

Embodiment 4

Figure 22:
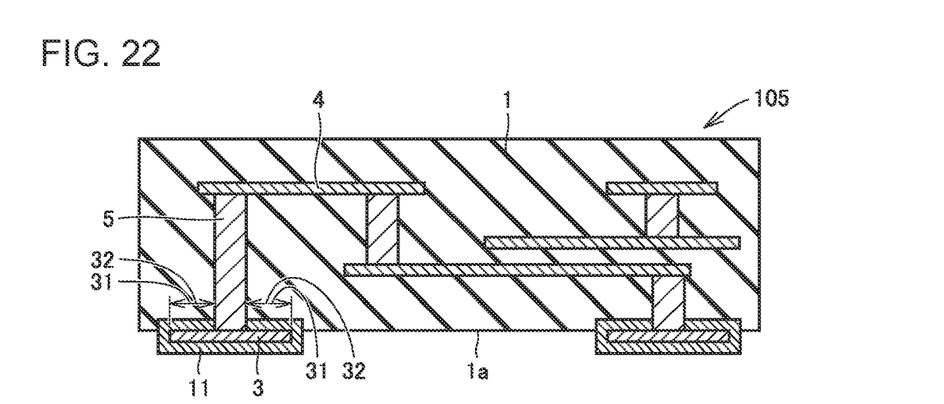
FIG. 22 is a cross-sectional view of a ceramic electronic component in Embodiment 4 based on the present disclosure.

Referring to FIGS. 22 to 23, a ceramic electronic component in Embodiment 4 based on the present disclosure will be described. As shown in FIG. 22, a ceramic electronic component 105 in this embodiment shares the same basic configuration as ceramic electronic component 101 described in Embodiment 1. In ceramic electronic component 105, the entire overhanging portion 31 of external electrode 3 is peeled portion 32. In ceramic electronic component 105, plating film 11 is formed to the back side of peeled portion 32, namely, to the surface of peeled portion 32 facing ceramic body 1. In other words, in peeled portion 32, plating film 11 is sandwiched between ceramic body 1 and overhanging portion 31.

To realize such a configuration, the following manufacturing method may be employed, for example. The first part of the manufacturing method, namely, the stacking of ceramic green sheets 41 to obtain a stack, is the same as was described in Embodiment 3. When firing this stack, the maximum temperature itself during firing is increased, or the time during which the stack is maintained at the maximum temperature is increased. By doing so, external electrode 3 is peeled off from ceramic body 1 during the firing step due to the difference in shrinkage between the ceramic material and the electrode material, and peeled portion 32 is consequently formed. Since the plating is performed later, a plating solution used for the plating can penetrate to the back side of peeled portion 32. As a result, plating film 11 is formed to the back side of peeled portion 32. It should be noted that plating film 11 and ceramic body 1 are not sintered to each other. Plating film 11 and ceramic body 1 may contact each other with no gap between them, but they are not fixed to each other.

Figure 23:
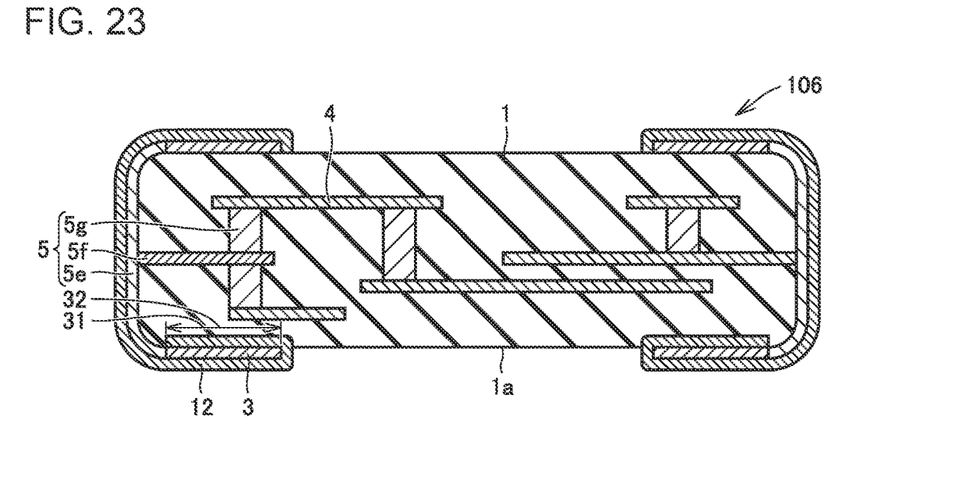
FIG. 23 is a cross-sectional view of a modification of the ceramic electronic component in Embodiment 4 based on the present disclosure.

One possible modification is a configuration such as a ceramic electronic component 106 shown in FIG. 23. In this configuration, portion 5e of connection conductor 5 covers the side surface of ceramic body 1. Plating film 12 is formed to the back side of peeled portion 32, namely, to the surface of peeled portion 32 facing ceramic body 1, in ceramic electronic component 106 as well.

In this embodiment, there is no gap since plating films 11 and 12 are formed to the back side of peeled portion 32, so that moisture intrusion into the gap can be prevented.

Embodiment 5

Figure 24:
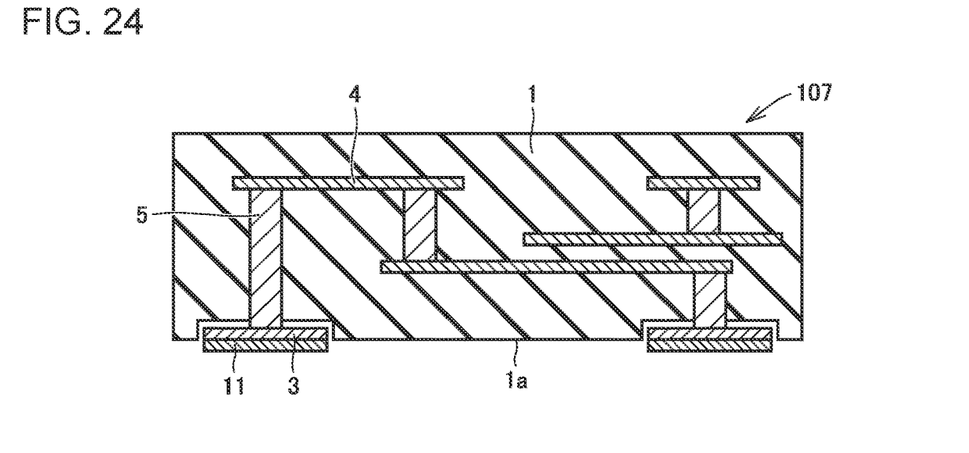
FIG. 24 is a cross-sectional view of a ceramic electronic component in Embodiment 5 based on the present disclosure.

Referring to FIG. 24, a ceramic electronic component in Embodiment 5 based on the present disclosure will be described. As shown in FIG. 24, a ceramic electronic component 107 in this embodiment shares the same basic configuration as ceramic electronic component 101 described in Embodiment 1. In ceramic electronic component 107, external electrode 3 is sunk in ceramic body 1. In other words, at least a portion of external electrode 3 is embedded in first surface 1a. The entire thickness of external electrode 3 may be sunk in ceramic body 1, or a portion of the thickness may be sunk in ceramic body 1. To further paraphrase, ceramic body 1 has a recess in first surface 1a, and at least a portion of external electrode 3 fits in this recess.

In this embodiment, the peeled portion on the back side of external electrode 3 is sunk from first surface 1a, so that the structure resistant can be made resistant to external factors such as moisture intrusion and foreign matter contamination.

Embodiment 6

Figure 25:
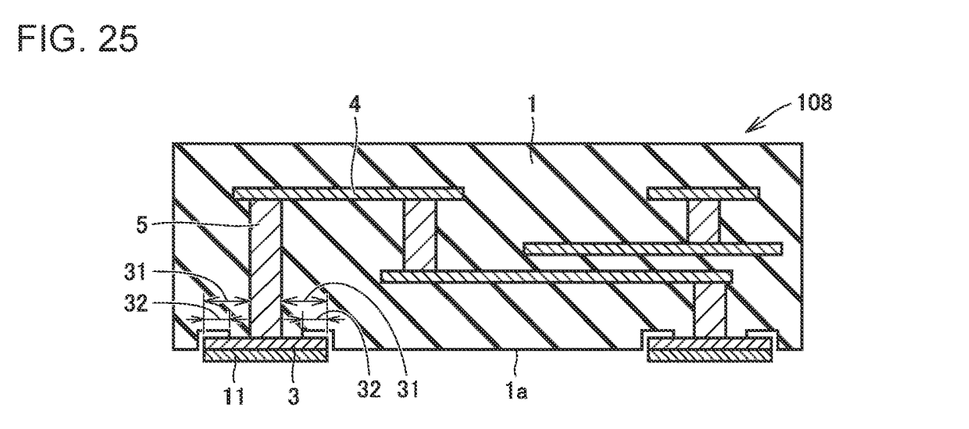
FIG. 25 is a cross-sectional view of a ceramic electronic component in Embodiment 6 based on the present disclosure.

Referring to FIG. 25, a ceramic electronic component in Embodiment 6 based on the present disclosure will be described. As shown in FIG. 25, a ceramic electronic component 108 in this embodiment shares the same basic configuration as ceramic electronic component 101 described in Embodiment 1. In ceramic electronic component 108, only a portion of overhanging portion 31 is peeled portion 32.

The degree of adhesion between ceramic body 1 and external electrode 3 can be changed by appropriately altering the conditions of the firing step in the manufacturing method. For example, glass can be segregated at the interface between ceramic body 1 and external electrode 3 by adjusting the length of time during which the stack is maintained at the maximum temperature during firing. The degree of adhesion between them can thereby be changed. The difference in the degree of adhesion that can be produced in this manner can be used to set the extent to which peeled portion 32 is formed in overhanging portion 31.

If the portion where external electrode 3 is connected to connection conductor 5 is so small that external electrode 3 cannot be held sufficiently strongly, peeled portion 32 can be intentionally set to be smaller than overhanging portion 31 as in this embodiment, to thereby allow sufficient holding of external electrode 3. This can also make it less likely that cracks will be formed in the portion where external electrode 3 is joined to connection conductor 5.

Embodiment 7

Figure 26:
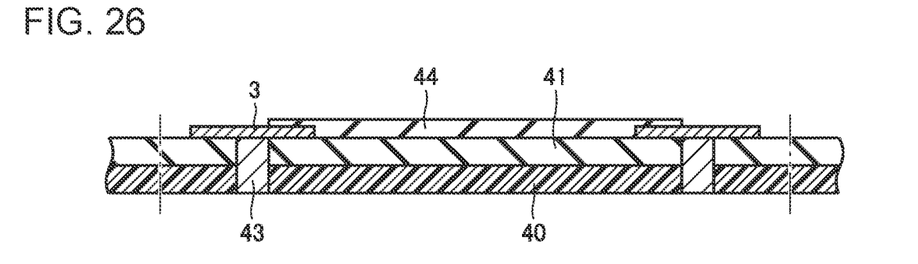
FIG. 26 is an illustrative view of a manufacturing method for obtaining a ceramic electronic component in Embodiment 7 based on the present disclosure.
Figure 27:
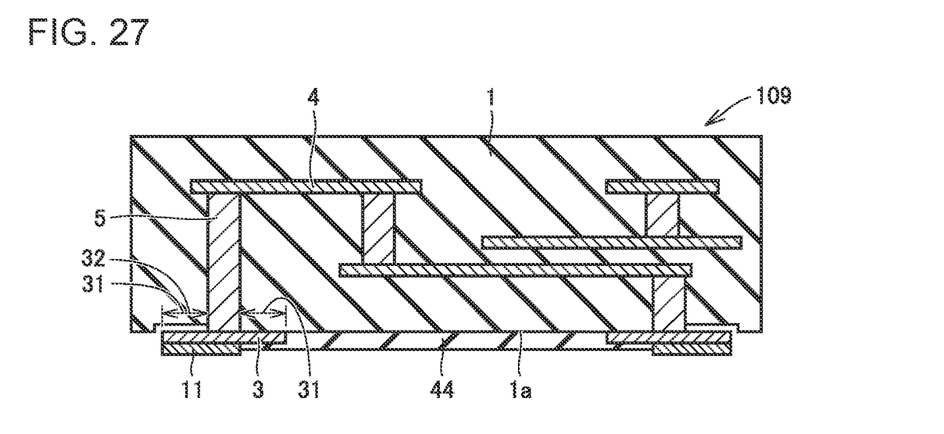
FIG. 27 is a cross-sectional view of the ceramic electronic component in Embodiment 7 based on the present disclosure.
Figure 28:
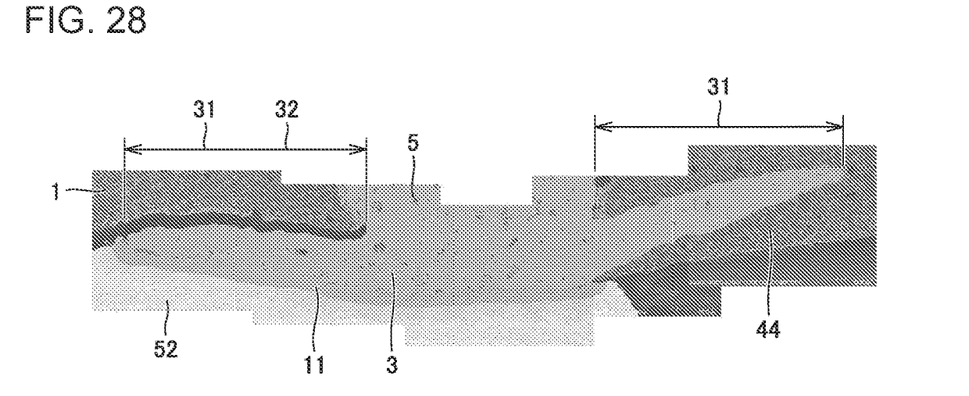
FIG. 28 is a photograph corresponding to an external electrode shown in FIG. 27 and its vicinity.

Referring to FIGS. 26 to 28, a ceramic electronic component in Embodiment 7 based on the present disclosure will be described. To obtain this ceramic electronic component, after external electrode 3 is printed on the surface of ceramic green sheet 41 held on carrier film 40, a protective film 44 is further formed as shown in FIG. 26. Protective film 44 can be formed by, for example, printing a ceramic paste. Protective film 44 is formed to cover a portion of external electrode 3.

FIG. 27 shows a ceramic electronic component 109 fabricated using ceramic green sheet 41 on which protective film 44 has been thus formed. External electrode 3 is located on a lower surface of ceramic electronic component 109, and a portion of external electrode 3 is covered with protective film 44.

In ceramic electronic component 109, the peeling off of external electrode 3 from ceramic body 1 does not occur in the region where external electrode 3 is covered with protective film 44. As shown in FIG. 27, in ceramic electronic component 109, only the portion of overhanging portion 31 of external electrode 3 that is not covered with protective film 44 is peeled portion 32. In this embodiment, a portion of external electrode 3 is covered with protective film 44, and peeled portion 32 is not covered with protective film 44.

While a ceramic paste is printed on ceramic green sheet 41 in order to form protective film 44 in this example, the material of protective film 44 is preferably the same as that of ceramic body 1 as much as possible. This is because protective film 44 of the same material is well connected to ceramic body 1. Protective film 44 is preferably made of a ceramic material. If protective film 44 is formed by printing a ceramic paste, protective film 44 is made of a ceramic material.

FIG. 28 shows a photomicrograph corresponding to a portion of FIG. 27. The photograph of FIG. 28 corresponds to external electrode 3 on the left side of FIG. 27 and its vicinity. The photograph shown in FIG. 28 is a combination of a plurality of photographs, each taken at a different position. While there is no solder 52 in FIG. 27, the photograph of FIG. 28 was taken with solder 52 attached. In FIG. 28, a portion of the right side of the surface of external electrode 3 is covered with protective film 44. Since protective film 44 is formed of a ceramic paste, and is thus made of the same material as ceramic body 1, protective film 44 looks the same as ceramic body 1. Plating film 11 is formed on the surface of a portion of external electrode 3 that is not covered with protective film 44. Plating film 11 covers external electrode 3 with a constant thickness. Solder 52 is disposed to adhere to plating film 11.

Even if the entire external electrode 3 is printed using a conductive paste having similarly poor sinterability, the extent of formation of peeled portion 32 can be controlled by covering a portion of external electrode 3 with protective film 44. As illustrated in this embodiment, protective film 44 may cover a portion of external electrode 3 where peeled portion 32 does not need to be formed, to prevent the formation of peeled portion 32. Peeled portion 32 may be formed in a portion of ceramic body 1 where stress is likely to be applied, and peeled portion 32 may not be formed in a portion of ceramic body 1 where stress is not likely to be applied. By minimizing the extent of formation of the peeled portion, the formation of cracks in the portion where external electrode 3 is connected to connection conductor 5 can be suppressed.

Embodiment 8

Figure 29:
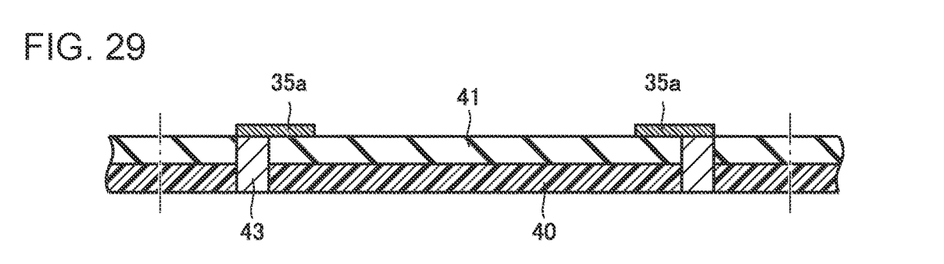
FIG. 29 is a first illustrative view of a manufacturing method for obtaining a ceramic electronic component in Embodiment 8 based on the present disclosure.
Figure 30:
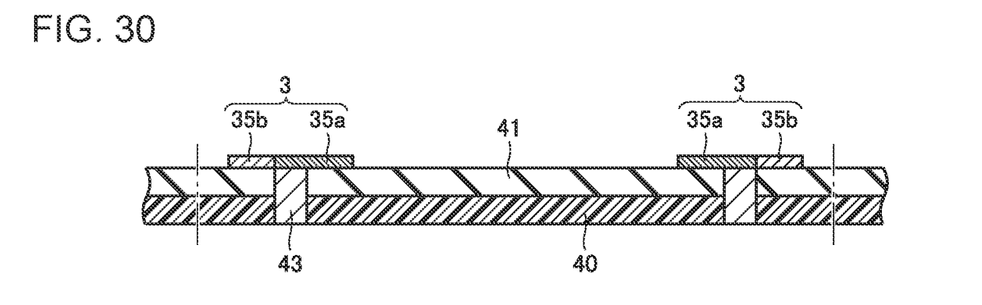
FIG. 30 is a second illustrative view of the manufacturing method for obtaining the ceramic electronic component in Embodiment 8 based on the present disclosure.
Figure 31:
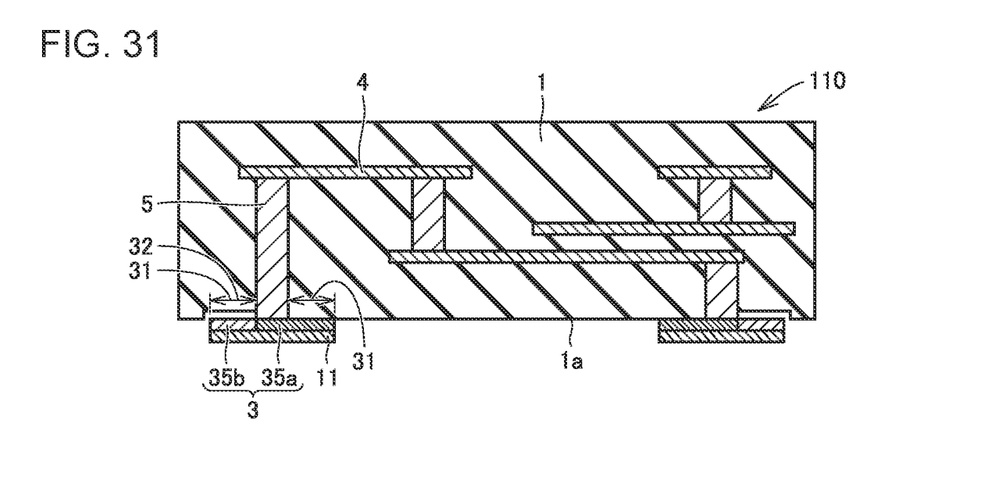
FIG. 31 is a cross-sectional view of the ceramic electronic component in Embodiment 8 based on the present disclosure.

Referring to FIGS. 29 to 31, a ceramic electronic component in Embodiment 8 based on the present disclosure will be described. To obtain this ceramic electronic component, the step of forming external electrode 3 is performed at the stage where ceramic green sheet 41 is held on carrier film 40, as indicated below. Here, external electrode 3 is printed in two separate steps. First, as shown in FIG. 29, a first portion 35a is printed as a portion of external electrode 3. First portion 35a is printed to cover conductive paste 43 filling hole 42. Further, a second portion 35b is printed as shown in FIG. 30. A conductive paste having good sinterability with ceramic is used to print first portion 35a. This is a conductive paste containing an inorganic component similar to that of the ceramic base material. This could be, for example, a conductive paste having a content ratio of an inorganic component other than metal of 5% by weight or more and 20% by weight or less. On the other hand, a conductive paste having poor sinterability with ceramic is used to print second portion 35b. The details of the "conductive paste having poor sinterability with ceramic" are as described in Embodiment 3. This could be, for example, a conductive paste having a content ratio of an inorganic component other than metal of 5% by weight or less. After external electrode 3 is formed by the combination of first portion 35a and second portion 35b as shown in FIG. 30, this ceramic green sheet 41 is stripped from carrier film 40 and used. A ceramic electronic component 110 shown in FIG. 31 can thus be obtained. Ceramic green sheet 41 shown in FIG. 30 is used as the lowermost layer of ceramic electronic component 110. In FIG. 31, plating film 11 is formed to cover external electrode 3. Plating film 11 is formed across both first portion 35a and second portion 35b of external electrode 3. Second portion 35b is easily peeled off from ceramic body 1, and thus becomes peeled portion 32. Since first portion 35a is not peeled off and only second portion 35b becomes peeled portion 32 in overhanging portion 31, peeled portion 32 can be formed only in a desired portion of overhanging portion 31.

In this embodiment, the extent of formation of peeled portion 32 can be controlled by combining two types of materials different in sinterability as the material forming external electrode 3. Therefore, a similar effect to that described in Embodiment 7 can be obtained in this embodiment as well.

Embodiment 9

Figure 32:
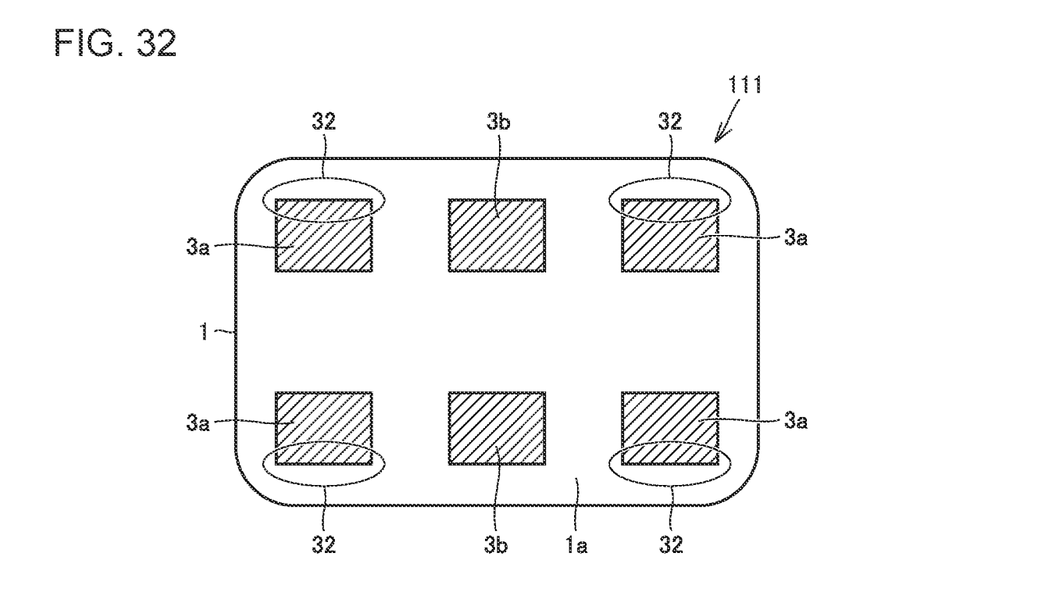
FIG. 32 is a bottom view of a ceramic electronic component in Embodiment 9 based on the present disclosure.

When only a portion of overhanging portion 31 of external electrode 3 is formed as peeled portion 32 as described in Embodiments 7 and 8, the following configuration is also possible. Referring to FIGS. 25 to 32, a ceramic electronic component in Embodiment 9 based on the present disclosure will be described. FIG. 32 shows a ceramic electronic component 111 according to this embodiment as seen from below. That is, first surface 1a of ceramic body 1 of ceramic electronic component 111 is visible. While a cross-sectional view of ceramic electronic component 111 is not provided, see instead the cross-sectional view of ceramic electronic component 110 shown in FIG. 31.

Ceramic electronic component 111 includes: ceramic body 1 having first surface 1a; a plurality of external electrodes 3 disposed at least on first surface 1*a*; internal electrode 4 disposed inside ceramic body 1; and connection conductor 5 connected to each of the plurality of external electrodes 3 and extending through the surface or the interior of ceramic body 1 to electrically connect to internal electrode 4. Each of the plurality of external electrodes 3 includes overhanging portion 31 extending laterally from its portion connected to connection conductor 5. The plurality of external electrodes 3 include a first-type external electrode 3*a* and a second-type external electrode 3*b*. In first-type external electrode 3*a*, at least a portion of overhanging portion 31 is peeled portion 32 peeled off from ceramic body 1. In second-type external electrode 3*b*, the entire overhanging portion 31 adheres to ceramic body 1.

In this embodiment, the plurality of external electrodes 3 include first-type external electrode 3*a* and second-type external electrode 3*b*, and at least a portion of overhanging portion 31 is peeled portion 32 only in first-type external electrode 3*a*. Therefore, peeled portion 32 can be selectively provided only in a portion where the formation of cracks of ceramic body 1 due to stress is of particular concern.

As illustrated in this embodiment, first-type external electrode 3*a* is preferably disposed at a position closer to a corner of first surface 1*a* than second-type external electrode 3*b*. At the position closer to the corner of first surface 1*a*, stress is particularly likely to be concentrated when a shock is applied, and the formation of cracks of ceramic body 1 can be a problem. By disposing first-type external electrode 3*a*, namely, an external electrode having peeled portion 32, at the position closer to the corner in this manner, the formation of cracks can be effectively prevented.

Peeled portion 32 of first-type external electrode 3*a* is preferably provided at least on a side of first-type external electrode 3*a* that is close to a corner of first surface 1*a*. Since it is believed that the actual stress largely acts on a portion of one first-type external electrode 3*a* that is close to a corner, the formation of cracks can be more effectively prevented by disposing peeled portion 32 in this manner.

Although a total of six external electrodes are arranged in a 3×2 matrix on first surface 1*a* of ceramic body 1 in this embodiment, this is only exemplary. The number of the plurality of external electrodes may be other than six. The plurality of external electrodes are not limited to be arranged in a matrix, but may be arranged in other manners.

More than one of the above-described embodiments may be employed in an appropriate combination.

The above embodiments disclosed herein are given by way of illustration in all respects, not by way of limitation. The scope of the present disclosure is defined by claims, and encompasses all modifications and variations equivalent in meaning and scope to the claims.

1 ceramic body; 1*a* first surface; 1*b* second surface; 3 external electrode; 3*a* first-type external electrode; 3*b* second-type external electrode; 4 internal electrode; 5 connection conductor; 5*e*, 5*f*, 5*g* portion (of connection conductor); 11, 12 plating film; 31 overhanging portion; 32 peeled portion; 34 gap; 35*a* first portion; 35*b* second portion; 40 carrier sheet; 41 ceramic green sheet; 42 hole; 43 conductive paste; 44 protective film; 50 substrate; 51 electrode; 52 solder; 101, 102, 103, 104, 105, 106, 107, 108, 109, 110, 111 ceramic electronic component.

The invention claimed is:

1. A ceramic electronic component comprising:
a ceramic body having a first surface;
an external electrode disposed at least on the first surface;
an internal electrode disposed inside the ceramic body; and
a connection conductor connected to the external electrode and extending through a surface or an interior of the ceramic body to electrically connect to the internal electrode, wherein
the external electrode includes an overhanging portion extending laterally from a connecting portion of the external electrode connected to the connection conductor, and
at least a portion of the overhanging portion is a peeled portion peeled off from the ceramic body.

2. The ceramic electronic component according to claim 1, wherein
the ceramic electronic component is mounted on another member through the external electrode.

3. The ceramic electronic component according to claim 2, wherein
in the peeled portion, a plating film is sandwiched between the ceramic body and the overhanging portion.

4. The ceramic electronic component according to claim 2, wherein
at least a portion of the external electrode is embedded in the first surface.

5. The ceramic electronic component according to claim 2, wherein
a portion of the external electrode is covered with a protective film, and the peeled portion is not covered with the protective film.

6. The ceramic electronic component according to claim 1, wherein
in the peeled portion, a plating film is sandwiched between the ceramic body and the overhanging portion.

7. The ceramic electronic component according to claim 6, wherein
at least a portion of the external electrode is embedded in the first surface.

8. The ceramic electronic component according to claim 6, wherein
a portion of the external electrode is covered with a protective film, and the peeled portion is not covered with the protective film.

9. The ceramic electronic component according to claim 1, wherein
at least a portion of the external electrode is embedded in the first surface.

10. The ceramic electronic component according to claim 9, wherein
a portion of the external electrode is covered with a protective film, and the peeled portion is not covered with the protective film.

11. The ceramic electronic component according to claim 1, wherein
a portion of the external electrode is covered with a protective film, and the peeled portion is not covered with the protective film.

12. The ceramic electronic component according to claim 11, wherein
the protective film comprises a ceramic material.

13. The ceramic electronic component according to claim 11, wherein
an interface between the protective film and the ceramic body is coplanar with an interface between the external electrode and the ceramic body.

14. A ceramic electronic component comprising:
a ceramic body having a first surface;
a plurality of external electrodes disposed at least on the first surface;

an internal electrode disposed inside the ceramic body; and
a connection conductor connected to each of the plurality of external electrodes and extending through a surface or an interior of the ceramic body to electrically connect to the internal electrode, wherein
each of the plurality of external electrodes includes an overhanging portion extending laterally from a connecting portion of each of the plurality of external electrodes connected to the connection conductor,
the plurality of external electrodes include a first-type external electrode and a second-type external electrode,
in the first-type external electrode, at least a portion of the overhanging portion is a peeled portion peeled off from the ceramic body, and
in the second-type external electrode, an entire portion of the overhanging portion adheres to the ceramic body.

15. The ceramic electronic component according to claim 14, wherein
the first-type external electrode is disposed at a position closer to a corner of the first surface than the second-type external electrode.

16. The ceramic electronic component according to claim 15, wherein
the peeled portion of the first-type external electrode is provided at least on a side of the first-type external electrode closer to a corner of the first surface.

17. The ceramic electronic component according to claim 14, wherein
the peeled portion of the first-type external electrode is provided at least on a side of the first-type external electrode closer to a corner of the first surface.

18. The ceramic electronic component according to claim 14, wherein
a portion of the external electrode is covered with a protective film, and the peeled portion is not covered with the protective film.

19. The ceramic electronic component according to claim 18, wherein
an interface between the protective film and the ceramic body is coplanar with an interface between the external electrode and the ceramic body.

\* \* \* \* \*